United States Patent [19]

de Zarauz

[11] 4,195,013

[45] Mar. 25, 1980

[54] ELASTOMER COMPOSITION FOR PNEUMATIC TIRE TREADS

[75] Inventor: Yves de Zarauz, Le Cendre, France

[73] Assignee: Compagnie Generale des Etablissements Michelin, Clermont-Ferrand, France

[21] Appl. No.: 891,446

[22] Filed: Mar. 29, 1978

Related U.S. Application Data

[63] Continuation of Ser. No. 706,700, Jul. 19, 1976, abandoned, which is a continuation-in-part of Ser. No. 591,817, Jun. 30, 1975, abandoned.

[30] Foreign Application Priority Data

Jun. 28, 1974 [FR] France ............................. 74 22809

[51] Int. Cl.² .............................................. C08K 3/04
[52] U.S. Cl. ............................. 260/42.33; 152/330 R; 526/281
[58] Field of Search ...................... 260/42.33; 526/281, 526/282, 283, 308

[56] References Cited

U.S. PATENT DOCUMENTS

| | | | |
|---|---|---|---|
| 3,467,631 | 9/1969 | Valvassori | 526/281 |
| 3,467,633 | 9/1969 | Harris | 156/334 |
| 3,478,002 | 11/1969 | Nakaguchi | 526/281 |
| 3,658,639 | 4/1972 | Wirth | 152/330 |
| 3,723,399 | 3/1973 | Amiard | 526/281 |
| 3,876,595 | 4/1975 | Ogura | 526/281 |

*Primary Examiner*—Paul R. Michl
*Attorney, Agent, or Firm*—Brumbaugh, Graves, Donohue & Raymond

[57] ABSTRACT

Tire treads having both suitable skid resistance and hysteresis properties can be made from ethylene-α-olefin-nonconjugated diene elastomeric polymers by modifying the polymers with a sterically hindering unhalogenated mono-olefin monomer or with a mixture of sterically hindering unhalogenated mono-olefin monomers, such as norbornene and its unhalogenated derivatives.

4 Claims, 3 Drawing Figures

ELASTOMER COMPOSITION FOR PNEUMATIC TIRE TREADS

This is a continuation application of U.S. application Ser. No. 706,700, filed July 19, 1976 (now abandoned), which U.S. application Ser. No. 706,700, filed July 19, 1976, is a continuation-in-part application of U.S. application Ser. No. 591,817, filed June 30, 1975 (now abandoned).

The present invention relates to improvements in new or recapped pneumatic tires having a tread composed of modified elastomers of the ethylene -α-olefin-termonomer type.

Elastomers of the ethylene-propylene-termonomer type, also known under the designation "EPT" or "EPDM" are, as is known, copolymers of ethylene, propylene, and a nonconjugated diene. The nonconjugated diene which may be cyclic or linear, is intended to introduce unsaturations which make elastomers of the ethylene-propylene type capable of being vulcanized with sulfur; it may for instance be dicyclopentadiene, 1,5-cyclo-octadiene, 1,4-hexadiene, ethylidene-norbornene, methylene-norbornene, tetrahydroindene, methyl-tetrahydroindene, etc., or some other diene which is copolymerizable with ethylene and propylene.

The EPDMs are elastomers obtained from raw materials such as ethylene and propylene, which are less expensive than butadiene and styrene, since they are less highly processed products than the latter.

These elastomers have certain advantages, particularly their resistance to aging and to oxidation, related on the one hand to their low degree of unsaturation and on the other hand to the position of the double bonds with respect to the chain. Therefore their use in the production of rubber articles, and in particular tires, may be advantageous. While their general properties are satisfactory as compared with those of the customary conjugated diene elastomers, the EPDMs on the other hand have a serious drawback which up to now has limited their field of use, namely, they have a low skid resistance, making it difficult to use them to form tire treads.

Various solutions have been proposed in order to remedy this major drawback. It has been attempted to change the nature and the percentage of the termonomer or else the composition of the monomers, but contrary to what is true in the case of the ordinary conjugated diene elastomers in which it is possible to modify the dampening and the skid resistance by the nature of the components of the polymer, modifications of the ethylene and propylene composition of the copolymer do not make it possible to obtain products having a sufficient skid resistance together with satisfactory properties of utilization and mechanical properties.

Thus with elastomers of the EPDM type, these changes do not make it possible to obtain an elastomer which has a sufficiently high skid resistance to constitute a tread which has sufficient adherence to the road in all weather, whatever the extent to which the tread is worn. Likewise, it has been attempted to increase the amount of carbon black or oil filler. However, when the proportion of carbon black or oil in the mixers is increased, while the skid resistance is, it is true, improved thereby, there is at the same time obtained a considerable reduction in the hysteresis properties and mechanical properties.

It has now been found that the above-mentioned drawbacks can be avoided in a surprising and economically advantageous fashion and that the intended goal of providing elastomers of EPDM type for tire treads which have an excellent skid resistance and substantially normal hysteresis properties as compared with those of a conventional EPDM containing a normal filling of carbon black and oil is reached by using EPDM-tye elastomers modified in accordance with the present invention.

The tire or the tread in accordance with the invention is characterized by the fact that the tread comprises an elastomer of the ethylene-α-olefin-nonconjugated diene tetrapolymer type containing a sterically hindering unhalogenated mono-olefin monomer or a mixture of sterically hindering unhalogenated mono-olefin monomers. By sterically hindering unhalogenated mono-olefin monomer there is understood a monomer which, when introduced in small quantity, makes it possible to increase the vitreous transition temperature of the tetrapolymer.

In other words, the invention consists in using EPDMs, the flexibility of the macromolecular chains of which has been reduced by incorporating sterically hindering unhalogenated mono-olefin monomers. These elastomers show an improvement in the shock-absorbing properties and in particular an improvement in the skid resistance which do not bring about any substantial reduction in the hysteresis properties.

It is advantageous to employ, for instance, sterically hindering compounds having a high rate of polymerization, for instance, polycyclic compounds such as norbornene and unhalogenated derivatives of norbornene of the following general formula in which $R_1$, $R_2$, $R_3$, $R_4$, $R_5$, $R_6$, $R_7$, $R_8$ represent hydrogen, or an aliphatic, cycloaliphatic, or aromatic unhalogenated hydrocarbon radical.

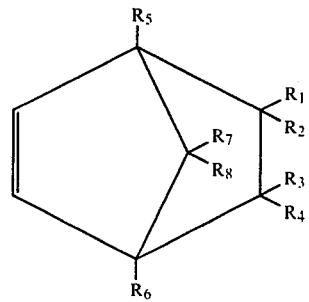

The sterically hindering compounds which are preferred are 2-norbornene, 5-methyl-2-norbornene, 5-hexyl-2-norbornene, 5,6-dimethyl-2-norbornene, 5-phenyl-2-norbornene, $(5,2,1,0^{2,6})$ tricyclo-8-decene, $(6,2,1,1^{3,6}, 0^{2,7})$ tetracyclo-9-dodecene. The elastomer obtained contains 3% to 30% by weight of these monomers and preferably 5% to 15%. The skid resistance is, as a matter of fact, a direct function of the amount of these compounds in the polymer.

The α-olefins used in conjunction with ethylene are those having the formula R-CH=CH$_2$ in which R represents an alkyl radical having one to eight carbon atoms. As α-olefins mention may be made of 1-propene, 1-butene, 1-pentene, 4-methyl-1-pentene, hexene, etc.

As tetrapolymers used there may be mentioned for instance those:
of ethylene-propylene-1,4-hexadiene-2-norbornene of ethylene-propylene-1,4-hexadiene-5-methyl-2-norbornene of ethylene-propylene-1,4-hexadiene-5-phenyl-2-norbornene of ethylene-propylene-ethylidene norbornene-2-norbornene of ethylene-propylene-ethylidene norbornene-5-methyl-2-norbornene of ethylene-propylene-ethylidene norbornene-5-phenyl-2-norbornene etc.

These polymers are prepared by methods which are known per se. They can be obtained by reacting them on a catalytic system formed of (a) a compound of a transition metal belonging to Groups IV to VIII of the Mendeleev periodic table of elements, and (b) compounds of elements of main Groups I to III of the Mendeleev periodic table of elements. The preferred compounds of the elements of Groups I to III are aluminum compounds of the formula Al $RX_1X_2$ in which R represents a hydrocarbon radical or a hydrogen atom and $X_1$ and $X_2$, which may be identical or different, have the same meaning as R or may represent halogens. More particularly, mention may be made of the alkyl aluminum sesquichlorides, the dialkyl aluminum halides, the monoalkyl aluminum halides and the trialkyl or triaryl aluminums.

Suitable compounds of metals of Groups IV to VIII of the periodic system are titanium tetrachloride, the esters of chlorotitanic acids, the derivatives of vanadium such as vanadium tetrachloride, vanadium oxytrichloride, the esters of vanadium such as vanadyl butylate, vanadyl isopropylate, vanadium triacetate, vanadium acetylacetonate, etc.

The copolymerization can be carried out in liquified monomers, possibly under pressure, in the presence of inert diluents such as aliphatic cycloaliphatic, or aromatic hydrocarbons, possibly halogenated, within a wide temperature range extending from $-20°$ C. to $+60°$ C. The reaction is stopped by the conventional processes and the polymers are recovered after evaporation of the diluent by steam distillation.

The invention is illustrated but not limited by the following examples. In these examples the structural characteristics of the polymers have in general been determined in the following manner: The composition of propylene is determined in infrared spectrography, the composition of hindering monomers is determined by nuclear magnetic resonance; the inherent viscosities are determined in ethylene tetrachloride in a concentration of 0.1 g. in 100cc.; the skid resistance index (SRT index) at 20° C. corresponds to the "wet skid index" measured with the skid resistance tester (SRT) marketed by the Stanley Company; the higher the index, the better the skid resistance. The vulcanization is effected at a temperature close to 150° C. for about 20 minutes.

EXAMPLE 1

In this example, copolymers of the ethylenepropylene-termonomer (EPDM) type which are conventional with respect to their properties are compared with an ordinary conjugated diene elastomer as a control. In the case of the EPDM I/1 and I/2 types continuous polymerization is carried out in an 8 liter reactor while the following rates of flow in liters/hour were maintained constant:

| For EPDM I/1 | | For EPDM I/2 | |
|---|---|---|---|
| Heptane | 15.5 | Toluene | 15.5 |
| Ethylene | 270 | Ethylene | 300 |
| Propylene | 700 | Propylene | 675 |
| 1,4-hexadiene | 0.12 | Ethylidene norbornene (4% by weight solution in toluene) | 0.4 |

| CONCENTRATIONS OF CATALYST | |
|---|---|
| $VO(OBu)_3$: | 0.21 m.mole/liter of heptane (for EPDM I/1) |
| | 0.047 m.mole/liter of toluene (for EPDM I/2) |
| $Cl_3Al_2(C_2H_5)_3$: | 2.1 m.mole/liter of heptane (for EPDM I/1) |
| | 0.47 m.mole/liter of toluene (for EPDM I/2) |

The properties are set forth in Table I below.

TABLE I

| | Test No. | | | |
|---|---|---|---|---|
| | EPDM I/1 | EPDM I/2 | NORDEL 1070* I/3 | CONTROL |
| % by weight propylene in polymer | 42 | 40 | 41 | |
| Inherent viscosity (dl/g) | 2.58 | 2.85 | 3.32 | |
| Iodine number | 5.2 | 6.3 | 8.6 | |
| ML (1 + 4) at 130° C. | 60 | 83 | 70 | |
| FORMULATIONS AND PROPERTIES | | | | |
| Polymer | 100 | 100 | 100 | 100 |
| Oil | 40 | 40 | 55 | 38 |
| HAF Black | 70 | 70 | 80 | 70 |
| Modulus of elongation (100%), kg/cm² | 16 | 14.4 | | |
| Hysteresis loss at 60° C. (%) | 32.6 | 37 | 37 | 34 |
| SRT index at 20° C. | 87 | 82 | 83 | 100 |
| Termonomer | 1,4-Hexadiene | Ethylidene norbornene | 1,4-Hexadiene | |

*Nordel 1070 is an ethylene-propylene-1,4-hexadiene copolymer marketed by DuPont de Nemours.

The control consists of a mixture of 65% by weight of SBR 1500 and 35% by weight of polybutadiene.

It can be seen that viewed from the standpoint of their use as tire tread, these EPDM polymers have an insufficient skid resistance index of less than 90.

EXAMPLE 2

In this example, the properties of various conventional polymers of EPDM type are compared with those of conventional conjugated diene elastomers. The properties are set forth in Table II.

TABLE II

| Elastomer | SBR 1500 | Natural rubber | Nordel 1040* | Nordel 1070 |
|---|---|---|---|---|
| Vulcanizing system | S/Santocure | S/Santocure | S/TMTMS/MBT | S/TMTMS/MBT |
| Formulation: | | | | |
| Carbon black | 50 | 50 | 50 | 70 |
| Oil | 5 | 0 | 8 | 40 |
| Polymer | 100 | 100 | 100 | 100 |
| Modulus of elongation (100%), kg/cm$^2$ | 19.7 | 26.5 | 18 | 13.5 |
| Hysteresis loss at 60° C. (%) | 32 | 22.5 | 31.5 | 33.5 |
| SRT index at 20° C. | 100 | 70 | 74 | 76 |

*Nordel 1040 is an ethylene-propylene-1,4-hexadiene copolymer marketed by DuPont de Nemours.

It is noted that the SRT index of the EPDMs is low compared with that of the butadiene-styrene copolymer (SBR 1500) marketed by Shell. It is insufficient to make these EPDMs suitable for use in tire treads.

Santocure (n-cyclohexyl-mercaptobenzothiazolesulfenamide) is marketed by Monsanto.

TMTMS (tetramethylthiuram-monosulfide) is marketed under the tradename MONEX by the Naugatuck Chemical Co.

MBT (mercaptobenzothiazole) is marketed under the tradename CAPTAX by Vanderbitt Company, Inc.

EXAMPLE 3

This example describes the manufacture of a tetrapolymer in accordance with the invention, namely ethylene-propylene-ethylidene norbornene-5-phenyl-2-norbornene.

The polymerization is effected batchwise in a reactor into which toluene is introduced at 20° C., it being then saturated for 25 minutes with agitation by means of a stream of ethylene and propylene which had previously been mixed. The rate of flow of ethylene is 1.2 liters/minute and that of propylene 0.6 liters/minute.

There are then introduced:
1.5 cc of ethylidene norbornene
variable quantities of 5-phenyl-2-norbornene
0.25 m.mole of VO (OBu)$_3$ dissolved in toluene
2.50 m.mole of Cl$_3$Al$_2$(C$_2$H$_5$)$_3$ dissolved in toluene
and the rates of flow of ethylene and propylene are modified by changing to 1.6 liter/minute and 0.8 liter/minute, respectively. The reaction is stopped after 20 minutes by the addition of acetone, and the polymers are recovered.

The following formulation is used (parts by weight)

| polymer | 100 |
|---|---|
| carbon black | 65 |
| oil | 25 |
| ZnO | 5 |
| stearic acid | 1 |
| sulfur | 2.2 |
| TMTMS | 0.6 |
| MBT | 0.2 |

The properties are set forth in Table III.

TABLE III

| Test No. | III/1 | III/2 | III/3 | III/4 |
|---|---|---|---|---|
| 5-phenyl-2-norbornene introduced | 0 g. | 3 g. | 5 g. | 8 g. |
| into the reaction medium | | | | |
| Weight of polymer obtained | 28 g. | 27 g. | 26.4 g. | 25.4 g. |
| % by weight of 5-phenyl 2-norbornene in the modified EPDM | 0 | 6 | 9 | 12 |
| % by weight of propylene in the modified EPDM | 37 | 35 | 34 | 32 |
| Inherent viscosity (dl/g) | 2.50 | 2.63 | 2.47 | 2.53 |
| Vitreous transition temperature | −51° C. | −46° C. | −44° C. | −40° C. |
| Modulus of elongation (100%), kg/cm$^2$ | 24.5 | 25 | 22 | 23.5 |
| Hysteresis loss at 60° C. (%) | 27.7 | 30.1 | 29.4 | 32.6 |
| Scott fracture: rupture force (kg/cm$^2$) | 207 | 236 | 248 | 260 |
| Elongation at rupture (%) | 475 | 512 | 540 | 540 |
| SRT index at 20° C. | 100 | 112 | 118 | 126 |

It can be noted that this EPDM modified in accordance with the invention shows a substantial improvement in the skid resistance index without substantial loss of the hysteresis properties. Furthermore, it is noted that the increase in the skid resistance index is a direct function of the amount of 5-phenyl norbornene in the polymer.

EXAMPLE 4

This example relates to the tetrapolymer ethylene-propylene-1,4-hexadiene-5-phenyl-2-norbornene containing varying amounts of the hindering monomer.

The polymerization is effected continuously with the following rates of flow in liters/hour:

| heptane | 15.5 |
|---|---|
| ethylene | 175 |
| propylene | 450 |
| 1,4-hexadiene | 0.160 | with the following concentrations of catalyst:
VO (O Bu)$_3$: 0.142 m. mole/liter in heptane
Cl$_3$Al$_2$(C$_2$H$_5$)$_3$: 1.14 m. mole/liter in heptane The formulation of the mixtures is identical to that of Example 3.

The properties are set forth in Table IV.

TABLE IV

| Test No. | IV/1 | IV/2 | IV/3 | IV/4 | IV/5 |
|---|---|---|---|---|---|
| 5-phenyl-2-norbornene introduced into the reaction medium in grams | 0 | 2.5 | 3.75 | 5 | 10 |
| % by weight of 5-phenyl-2-norbornene in the modified EPDM | 0 | 5 | 7 | 9 | 16 |
| % by weight of propylene in the modified EPDM | 39 | 39 | 37 | 35 | 35 |
| Inherent viscosity (dl/g) | 2.08 | 2.14 | 2.20 | 2.25 | 2.46 |
| Modulus of elongation (100%) kg/cm$^2$ | 29.5 | 28.7 | 28.7 | 27.9 | 25.3 |
| Hysteresis loss at 60° C. (%) | 28.7 | 29.5 | 29.8 | 29.7 | 29.8 |
| Scott fracture: rupture force kg/cm$^2$ | 180 | 197 | 203 | 214 | 250 |
| Elongation at rupture (%) | 370 | 393 | 443 | 460 | 410 |
| SRT index at 20° C. | 100 | 108 | 114 | 121 | 142 |

There can be noted a substantial improvement in the skid resistance index without substantial reduction in the hysteresis properties. The mechanical properties, particularly the Scott fracture, are also improved.

The hysteresis loss index at 60° C. is defined by:

$$100 \times \frac{\text{hysteresis loss at 60° C. of the tetrapolymer}}{\text{hysteresis loss at 60° C. of the control polymer without phenyl-norbornene}}$$

The higher the hysteresis loss index, the poorer the hysteresis properties of the polymer.

Figure 1:
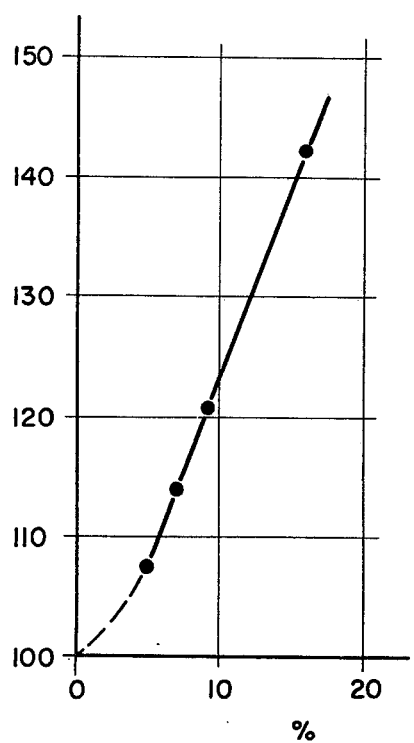
FIG. 1 shows the change in the SRT index (on the ordinate) as a function of the amount of 5-phenyl-2-norbornene incorporated (on the abscissa).
Figure 2:
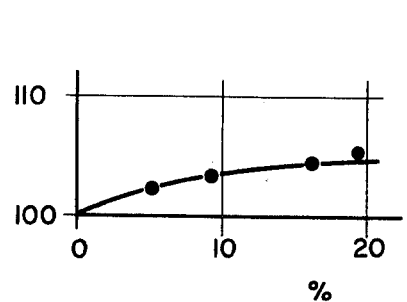
FIG. 2 shows the change in the hysteresis loss index at 60° C. (on the ordinate) as a function of the amount of 5-phenyl-2-norbornene incorporated (on the abscissa).
Figure 3:
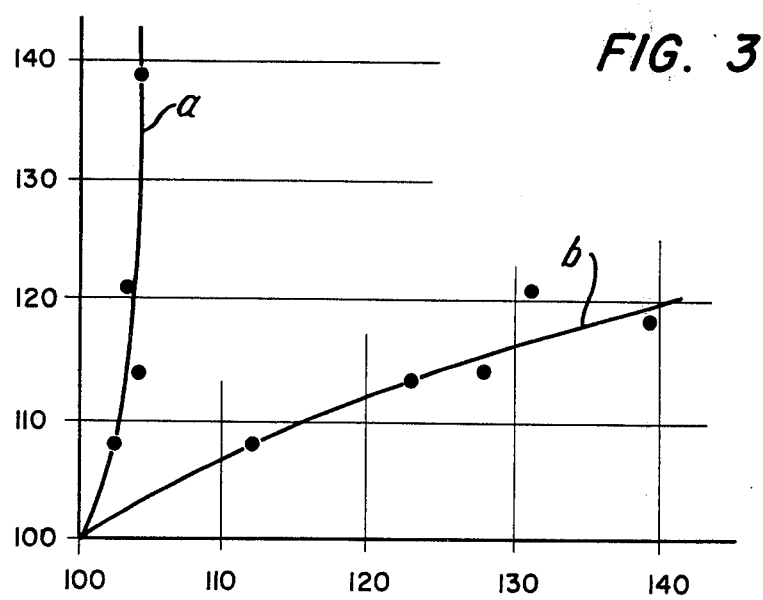

FIG. 3 shows the change in the SRT index (on the ordinate) as a function of the hysteresis loss index at 60° C. (on the abscissa). The compromise between road adherence and hysteresis loss is obtained by means:

(a) of ethylene-propylene-1,4-hexadiene-5-phenyl-2-norbornene polymers (curve a); the hysteresis loss index has the same definition as previously;

(b) of a conventional 1,4-hexadiene EPDM (Nordel 1660) by modifying the percentages of carbon black (curve b) with a formulation comprising 100 parts of polymer and 75 parts of oil.

In this example, the hysteresis loss index is defined by:

$$100 \times \frac{\text{hysteresis loss at 60° C. of the mixture studied}}{\text{hysteresis loss at 60° C. of the control mixture}}$$
$$(STR \text{ Index} = 100)$$

It is noted that the best compromise between road adherence and hysteresis properties is obtained by means of the polymers of the invention.

EXAMPLE 5

This example concerns the tetrapolymer ethylene-propylene-ethylidene norbornene-2-norbornene. One operates under the same conditions as those used in Example 1 for Test V/1, adding the 2-norbornene in a concentration of 6 g./l for Test V/2. The following weight formulation is employed: polymer 100, carbon black 70, oil 40, ZnO 4, stearic acid 1, sulfur 2, TMTDS (tetramethylthiuram-disulfide) 0.6, MBT 0.2. The properties are set forth in Table V below:

TABLE V

| Test No. | V/1 | V/2 |
|---|---|---|
| % by weight 2-norbornene in the modified EPDM | 0 | 11 |
| % by weight of propylene in the modified EPDM | 41 | 38 |
| Inherent viscosity (dl/g) | 3.05 | 2.98 |
| Modulus of elongation (100%) kg/cm$^2$ | 14.4 | 14 |
| Hysteresis loss at 60° C. (%) | 37 | 40 |
| Scott fracture: rupture force kg/cm$^2$ | 202 | 230 |
| Elongation at rupture (%) | 823 | 850 |
| SRT index at 20° C. | 100 | 116 |

EXAMPLE 6

This example concerns the tetrapolymer ethylene-propylene-1,4-hexadiene-2-norbornene.

One operates under the same conditions as those used in Example 1for Test VI/1, adding the 2-norbornene in a concentration of 4 g./l and 5.3 g./l in Tests VI/2 and VI/3, respectively. In this example, the influence of the percentages by weight of oil and carbon black are shown.

Formulation (a) polymer 100, carbon black 100, oil 75, ZnO 3, stearic acid 0.5, sulfur 1, MBT 0.5, TMTDS 1.

Formulation (b) polymer 100, carbon black 70, oil 40, ZnO 5, stearic acid 1, sulfur 1, TMTMS 5, MBT 0.5.

The properties are set forth in Table VI.

TABLE VI

| Test No. | VI/1 | | VI/2 | | VI/3 | |
|---|---|---|---|---|---|---|
| % by weight of 2-norbornene in the modified EPDM | 0 | | 6.5 | | 9.5 | |
| % by weight of propylene in the modified EPDM | 44 | | 42 | | 39 | |
| Inherent viscosity (dl/g) | 2.65 | | 2.57 | | 2.55 | |
| | (a) | (b) | (a) | (b) | (a) | (b) |
| Modulus of elongation (100%), kg/cm$^2$ | 13 | 16.1 | 12.7 | 14.4 | 12.4 | 14.5 |
| Hysteresis loss at 60° C. (%) | 41.3 | 32.6 | 44.1 | 35.5 | 45.4 | 37.3 |
| SRT index at 20° C. | 114 | 100 | 125 | 11 | 134 | 118 |
| Scott fracture: rupture | 179 | 203 | 179 | 216 | 181 | 233 |

TABLE VI-continued

| Test No. | VI/1 | | VI/2 | | VI/3 | |
|---|---|---|---|---|---|---|
| force kg/cm$^2$ | | | | | | |
| Elongation at rupture (%) | 693 | 640 | 730 | 726 | 747 | 737 |

It is noted that the invention applies to all the modified EPDMs whatever the formulation used for the vulcanizers, since it is the nature of the polymer which is modified.

EXAMPLE 7

In this example, there are described the properties (see Table VII) of the tetrapolymers obtained by the manner of procedure set forth in Example 4 with the following different derivatives of norbornene:
5,6-dimethyl-2-norbornene
5-hexyl-2-norbornene
(5,2,1,0$^{2,6}$) tricyclo-8-decene

TABLE VII

| Test No. | VII/1 | VII/3 | VII/4 | VII/5 |
|---|---|---|---|---|
| Hindering monomer | | (5,2,1,0$^{2,6}$) tricyclo-8-decene | 5,6-dimethyl-2-norbornene | 5-hexyl-2-norbornene |
| % by weight of hindering monomer | 0 | 8 | 9 | 9 |
| Inherent viscosity (dl/g) | 2.86 | 2.67 | 2.47 | 2.65 |
| Modulus of elongation (100%) kg/cm$^2$ | 24.5 | 26.5 | 23 | 22.3 |
| Hysteresis loss at 60° C. (%) | 28.2 | 30.4 | 31.5 | 30.5 |
| Scott fracture: rupture force kg/cm$^2$ | 206 | 232 | 194 | 195 |
| Elongation at rupture (%) | 392 | 432 | 420 | 417 |
| SRT index at 20° C. | 100 | 118 | 120 | 110 |

All these modified EPDM polymers contain 2% 1,4-hexadiene and 35% propylene by weight. The vulcanized products studied have the formulation: polymer 100, carbon black 65, oil 25, stearic acid 1, sulfur 2.2, TMTMS 0.6, MBT 0.2.

There is noted a substantial increase in the skid resistance index (wet skid index) associated with sufficient mechanical and hysteresis properties.

In summary, and more particularly, the present invention provides a pneumatic tire having a tread with an improved compromise between skid resistance and hysteresis properties, said tread comprising a sulfur-vulcanized elastomeric tetrapolymer containing a normal filling of from about 30 parts to about 200 parts, preferably about 60 parts to about 130 parts by weight of carbon black per 100 parts by weight of elastomeric tetrapolymer and of from about 25 to about 150 parts, preferably about 30 parts to about 100 parts by weight of oil per 100 parts by weight of elastomeric tetrapolymer, said elastomeric tetrapolymer containing from about 18% to about 75% by weight of ethylene, from about 20% to about 45% by weight of an acyclic α-olefin having the formula R-CH=CH$_2$ wherein R represents an alkyl radical having from 1 to 8 carbon atoms, from about 2% to about 7% by weight of a nonconjugated diene and from about 3% to about 30% by weight of at least one cyclic sterically hindering unhalogenated mono-olefin monomer.

The invention is not limited to the use of carbon black as a filler in the tetrapolymer. Other usual fillers, e.g. silica, can be used instead of carbon black with the same satisfactory results in all examples described above.

What is claimed is:

1. A pneumatic tire having a tread with an improved compromise between skid resistance and hysteresis properties, said tread comprising a sulfurvulcanized elastomeric terapolymer containing a filler such as carbon black or silica and an extension oil, said elastomeric tetrapolymer containing from about 18% to about 75% by weight of ethylene, from about 20% to about 45% by weight of an acyclic α-olefin having the formula R-CH=CH$_2$ wherein R represents an alkyl radical having from 1 to 8 carbon atoms, from about 2% to about 7% by weight of a nonconjugated diene and from about 5% to about 15% by weight of at least one cyclic sterically hindering unhalogenated mono-olefin monomer which is a norbornene compound having the formula

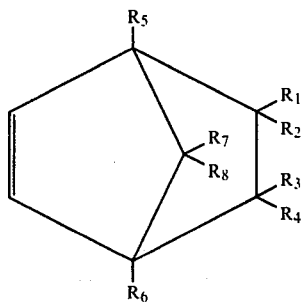

in which R$_1$, R$_2$, R$_3$, R$_4$, R$_5$, R$_6$, R$_7$, R$_8$ may be hydrogen or an aliphatic, cycloaliphatic or aromatic unhalogenated hydrocarbon radical.

2. The pneumatic tire according to claim 1 wherein the acyclic α-olefin is 1-propene.

3. A tread for use on a tire carcass, said tread having improved skid resistance and hysteresis properties and comprising a sulfur-vulcanized elastomeric tetrapolymer containing a filler such as carbon black or silica and an extension oil, said elastomeric tetrapolymer containing from about 18% to about 75% by weight of ethylene, from about 20% to about 45% by weight of an acyclic α-olefin having the formula R-CH=CH$_2$ wherein R represents an alkyl radical having from 1 to 8 carbon atoms, from about 2% to about 7% by weight of a nonconjugated diene and from about 5% to about 15% by weight of at least one cyclic sterically hindering unhalogenated mono-olefin monomer which is a norbornene compound having the formula

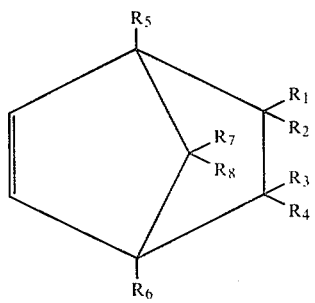
in which $R_1$, $R_2$, $R_3$, $R_4$, $R_5$, $R_6$, $R_7$, $R_8$ may be hydrogen or an aliphatic, cycloaliphatic or aromatic unhalogenated hydrocarbon radical.
4. The tread according to claim 3 wherein the acyclic α-olefin is 1-propene.
* * * * *

UNITED STATES PATENT AND TRADEMARK OFFICE
CERTIFICATE OF CORRECTION

PATENT NO. : 4,195,013
DATED : Mar. 25, 1980
INVENTOR(S) : Yves de Zarauz

It is certified that error appears in the above-identified patent and that said Letters Patent are hereby corrected as shown below:

Col. 2, line 9, "EPDM-tye" should read --EPDM-type--.

Col. 7, line 50, "STR Index" should read --SRT Index--.

Col. 8, penultimate line, third column from right margin, "11" should read --111--.

Col. 10, first line, "sulfurvulcanized" should read --sulfur-vulcanized--;

Col. 10, second line, "terapolymer" should read --tetrapolymer--.

Signed and Sealed this

Twelfth Day of August 1980

[SEAL]

Attest:

SIDNEY A. DIAMOND

Attesting Officer

Commissioner of Patents and Trademarks